United States Patent

Hodonsky

[11] Patent Number: 5,662,361
[45] Date of Patent: Sep. 2, 1997

[54] CONICAL WEDGE CONNECTING JOINT

[76] Inventor: Joseph W. Hodonsky, 8271 Ledgewood Ct., Fenton, Mich. 48430

[21] Appl. No.: 592,893

[22] Filed: Jan. 29, 1996

[51] Int. Cl.$^6$ .................................................. F16L 25/00
[52] U.S. Cl. ............................ 285/332; 285/363; 285/416
[58] Field of Search ................................ 285/405, 416, 285/332, 363

[56] References Cited

U.S. PATENT DOCUMENTS

| | | | |
|---|---|---|---|
| Re. 27,709 | 7/1973 | Holmgren | 285/416 X |
| 974,975 | 11/1910 | Kelly | 285/405 X |
| 1,403,773 | 1/1922 | Hanson | 285/332 |
| 1,641,839 | 9/1927 | Cain et al. | |
| 1,966,039 | 7/1934 | Muchnic | 285/332 X |
| 1,977,911 | 10/1934 | Hansen | 285/405 X |
| 2,335,040 | 11/1943 | Bruno | 285/416 X |
| 3,301,576 | 1/1967 | Vigneron | 285/332 X |
| 3,704,995 | 12/1972 | Hetherington | 285/332 |
| 3,848,421 | 11/1974 | O'Brien et al. | 285/405 X |
| 4,428,603 | 1/1984 | Davlin | 285/368 |

FOREIGN PATENT DOCUMENTS 517744   6/1976   U.S.S.R. .............................. 285/405

Primary Examiner—Dave W. Arola
Attorney, Agent, or Firm—Charles W. Chandler

[57] ABSTRACT

A fluid-tight joint formed by a pair of annular rings, each attached to the end of a tubular fluid-conducting conduit. The rings are similar, each having one side with a channel with a frusto-conical wall and the other side having a ridge with a frusto-conical wall receivable in the channel of a similarly-shaped ring. Threaded fastener means engage the two sealing rings to form a fluid-tight joint in the area of contact between the two frusto-conical walls.

5 Claims, 2 Drawing Sheets

CONICAL WEDGE CONNECTING JOINT

BACKGROUND OF THE INVENTION

This invention is related to a joint for connecting a pair of conduits which pass either a liquid or a gas and require a high-degree of joint sealing integrity.

Internal combustion engine exhaust systems require a high degree of joint sealing integrity to satisfy federal standards. Such standards are expected to become particularly strict beginning with the 1996 models. Typically commercial joints comprise a pair of flat flanges welded around the conduit. A gasket is disposed between the flanges and fasteners clamp the two flanges together.

A variety of other types of joints are known in the prior art some of which use a spherical surface in the sealing structure between the two pipes. Other joints use a frusto-conical sealing surface, see for example, U.S. Pat. No. 1,641,839 which was issued on Sep. 6, 1927 to L. H. Cain, J. Hunter Brogan and Charles J. Brogan for "Tank-Hose Coupling"; U.S. Pat. No. 3,704,995 which issued on Dec. 5, 1972 to Theodore W. Hetherington for "Pipe Manifold Flange"; and U.S. Pat. No. 4,428,603 which issued Jan. 31, 1984 to Irwin H. Davlin for "Flange Union With Improved Metal-to-Metal Seals".

SUMMARY OF THE INVENTION

The broad purpose of the present invention is to provide an improved fluid-tight joint employing frusto-conical mating surfaces. The preferred embodiment of the invention employs a pair of similarly-shaped annular joint or sealing members each having a central opening for passing fluid. Each joint member is welded to the end of a conduit which delivers the fluid. Each joint member has an annular channel formed around the central opening. The channel has a concave frusto-conical wall. The opposite side of the joint member has an annular ridge formed around the central opening. The ridge has a convex frusto-conical wall which may be nested or seated in the annular channel of a similarly-shaped joint member.

Each joint member has an apertured flange for receiving threaded fastener members. The fasteners apply an axial force so that the two frusto-conical walls form a tight sealing joint between the two conduits. The pressure between the two joint members exceeds the pressure of the fluid inside the conduits thus providing an effective seal. The effectiveness of the joint seal is the result of the high angle of incidence between the sealing surfaces which is a multiple of the fastening force.

The preferred embodiment of the invention has advantages over commercially-available joints because it overcomes surface imperfections at the sealing surfaces, reduces sensitivity of clamp load variations to operating conditions, potentially eliminates additional joint components such as gaskets, and increases the effectiveness of gaskets.

Additional advantages include simplicity, low cost, suitability to various manufacturing processes, flexible application with and without gaskets and/or applied coatings. Both halves of the joint may be manufactured with the same tool in some applications.

Still further objects and advantages of the invention will become readily apparent to those skilled in the art to which the invention pertains upon reference to the detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
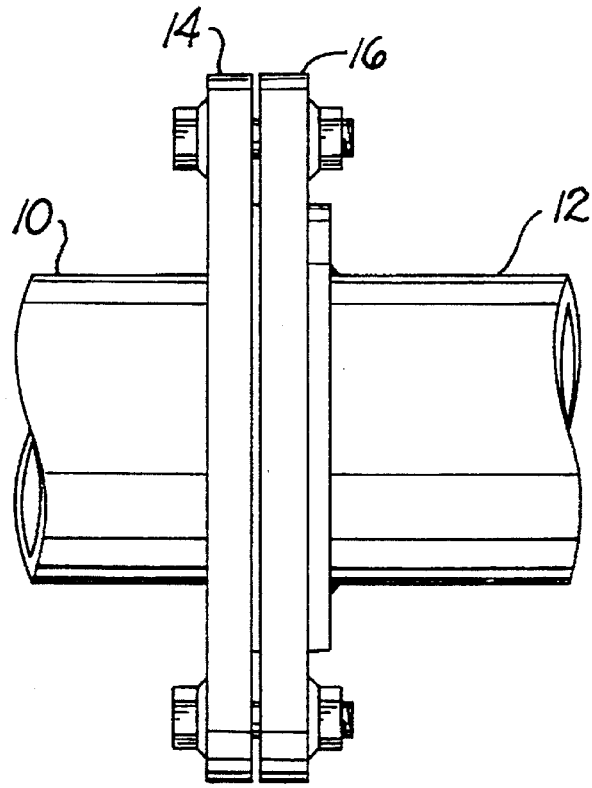
FIG. 1 illustrates a frusto-conical joint coupling a pair of fluid conducting conduits.

Referring to the drawings, a pair of fluid conducting conduits 10 and 12 are connected by a joint formed by a pair of identically shaped annular sealing members 14 and 16. The sealing members are joined together by threaded fastener means 18 and 20. Although the sealing members are illustrated as being identical, they may only be similar for the invention to be successful. Minor dissimilarities may be dictated by outside influence without affecting the preferred joint.

Figure 3:
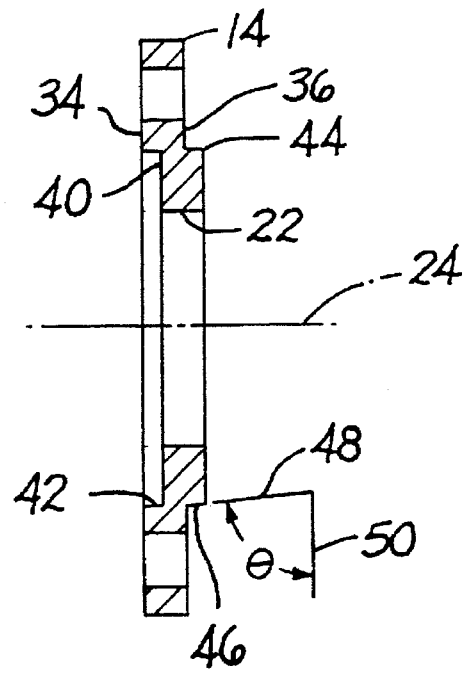
FIG. 3 is a view of a single sealing member.
Figure 4:
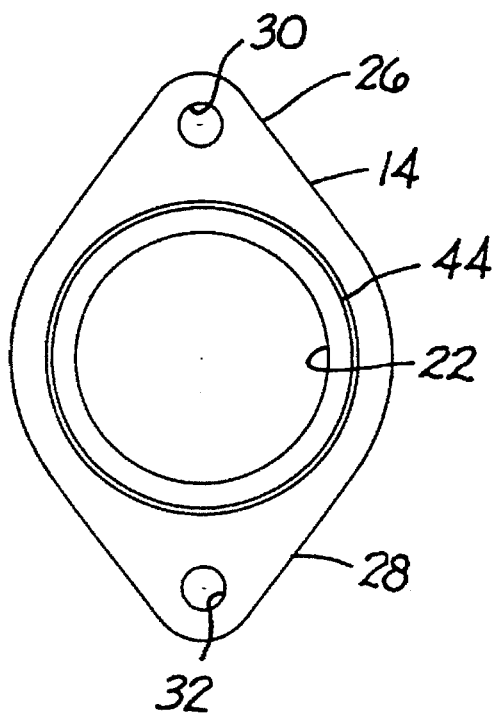
FIG. 4 is a view at right angles to the view of FIG. 3.

A typical sealing member 14 is illustrated in FIG. 3 and comprises a metal annular member having a central opening 22 formed about an axis 24. Sealing member 14 has a pair of ear-shaped flanges 26 and 28 formed with nut and bolt fastener-receiving openings 30 and 32, respectively. Preferably fastener-receiving openings 30 and 32 are disposed diametrically on opposite sides of central opening 22 when two fasteners are used.

Sealing member 14 has a generally flat first side 34 disposed in a plane at right angles to axis 24, and a flat second side 36 which is parallel to side 34.

Referring to FIG. 3, side 34 of the sealing member has an annular channel or recess 40 which includes a flat radial surface and a frusto-conical concave wall 42 which is formed symmetrically around axis 24. Side 36 of the sealing member has an annular ridge 44 which includes a flat radial surface and a frusto-conical wall or sealing surface or wall 46 which is also disposed symmetrically around axis 24. Wall 42 and wall 46 have similar diameters and a similar conical angle as illustrated in FIG. 3. Angle θ is the angle between a line 48 forming an extension of an element of the frusto-conical wall and a line 50 that is perpendicular to axis 24. For illustrative purposes, angle θ is 82.88° which will provide a sufficient mechanical advantage of the clamping force applied by the fasteners to lead the sealing surfaces between the two frusto-conical walls.

Figure 2:
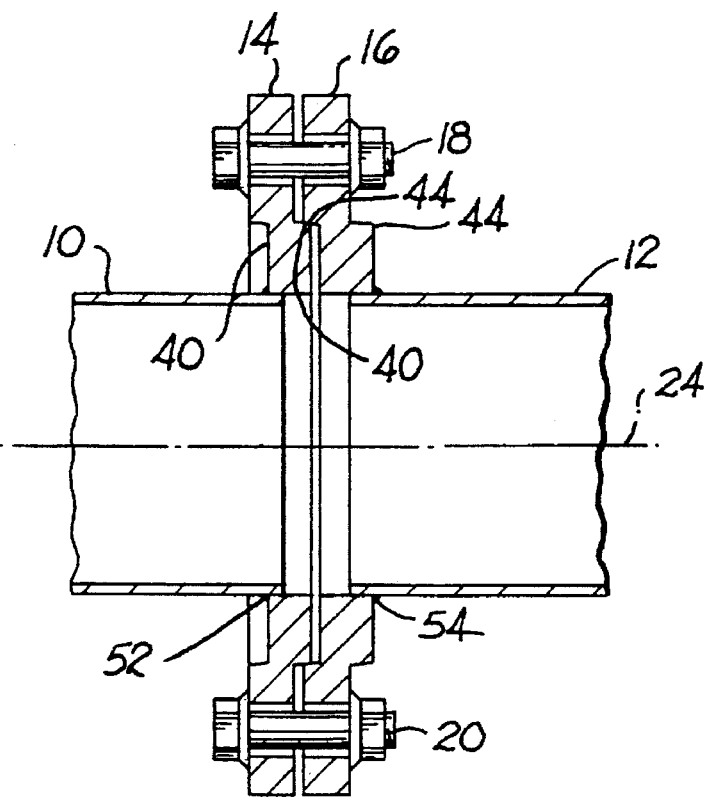
FIG. 2 is similar to FIG. 1 but showing the joint in section.

Referring to FIG. 2, the two sealing members 14 and 16 are welded at 52 and 54, respectively, entirely around conduits 10 and 12 after the ends of the conduits have been partially telescopically inserted into their respective sealing members. The two conduits are brought together as ridge 44 on sealing member 14 is seated in the channel 40 of sealing member 16. The frusto conical surfaces are formed such that the ridge of sealing member 14 does not bottom in channel 40 of sealing member 16 as their respective conical surfaces form a tight annular seal around their respective central openings.

Nut and bolt fasteners 18 and 20 are clamped on the two flanges to provide an axial force parallel to axis 24. When the two frusto-conical sealing surfaces are in surface-to-surface contact, they are essentially wedged together in a position in which there is a small clearance space between the two flanges. The axial force applied by the clamping fastening members is multiplied by the shape of the sealing surfaces to provide a tight seal between the two sealing members.

Although preferably the two sealing members are joined together without a gasket, under certain circumstances the sealing can be enhanced by a gasket formed or compressed between the flanges.

The sealing members can be produced by a variety of manufacturing processes, such as fine blank stamping, powdered metal, forging, casting as well as being machined.

Having described my invention, I claim:

1. A releasable frusto-conical wedge connecting joint between two tubular conduits, comprising:

two substantially identically-shaped annular sealing members (14, 16) formed separately from the associated conduits;

each of said sealing members having first and second major flat parallel side surfaces (34, 36), and a central opening centered on a central axis (24);

said first major side surface having an annular circular recess (40) concentric around said central axis, said circular recess having a first flat radial surface and a concave frusto-conical outer edge surface (42) centered on said central axis;

said second major side surface having an annular protruding ridge (44) concentric around said central axis, said protruding ridge having a second flat radial surface and a convex frusto-conical outer edge surface (46) centered on said central axis;

said central opening comprising an annular axial surface (22) interconnecting said first and second radial surfaces;

one of said sealing members having its annular axial surface affixed to an outer side surface of a first fluid conduit; the other sealing member having its annular axial surface affixed to an outer side surface of a second fluid conduit; said sealing members being oriented on the two conduits so that the annular ridge on said one sealing member nests, within the annular recess in the other sealing member; and fastener means (18, 20) extending through said sealing members parallel to said central axis, whereby the two sealing members are drawn axially toward each other to establish a pressure seal between the convex frusto-conical edge surface on said one sealing member and the concave frusto-conical edge surface on said other sealing member.

2. The frusto-conical connecting joint of claim 1, wherein the concave frusto-conical edge surface (42) and the convex frusto-conical edge surface (46) on each sealing member have the same cone angle.

3. The frusto-conical connecting joint of claim 2, wherein the common cone angle for said frusto-conical edge surfaces is approximately seven degrees.

4. The frusto-conical connecting joint of claim 1, wherein said annular axial surface (22) in each said sealing member is cylindrical.

5. The frusto-conical connecting joint of claim 1, wherein said sealing members have precisely the same identical shape.

* * * * *